Patented Apr. 10, 1934

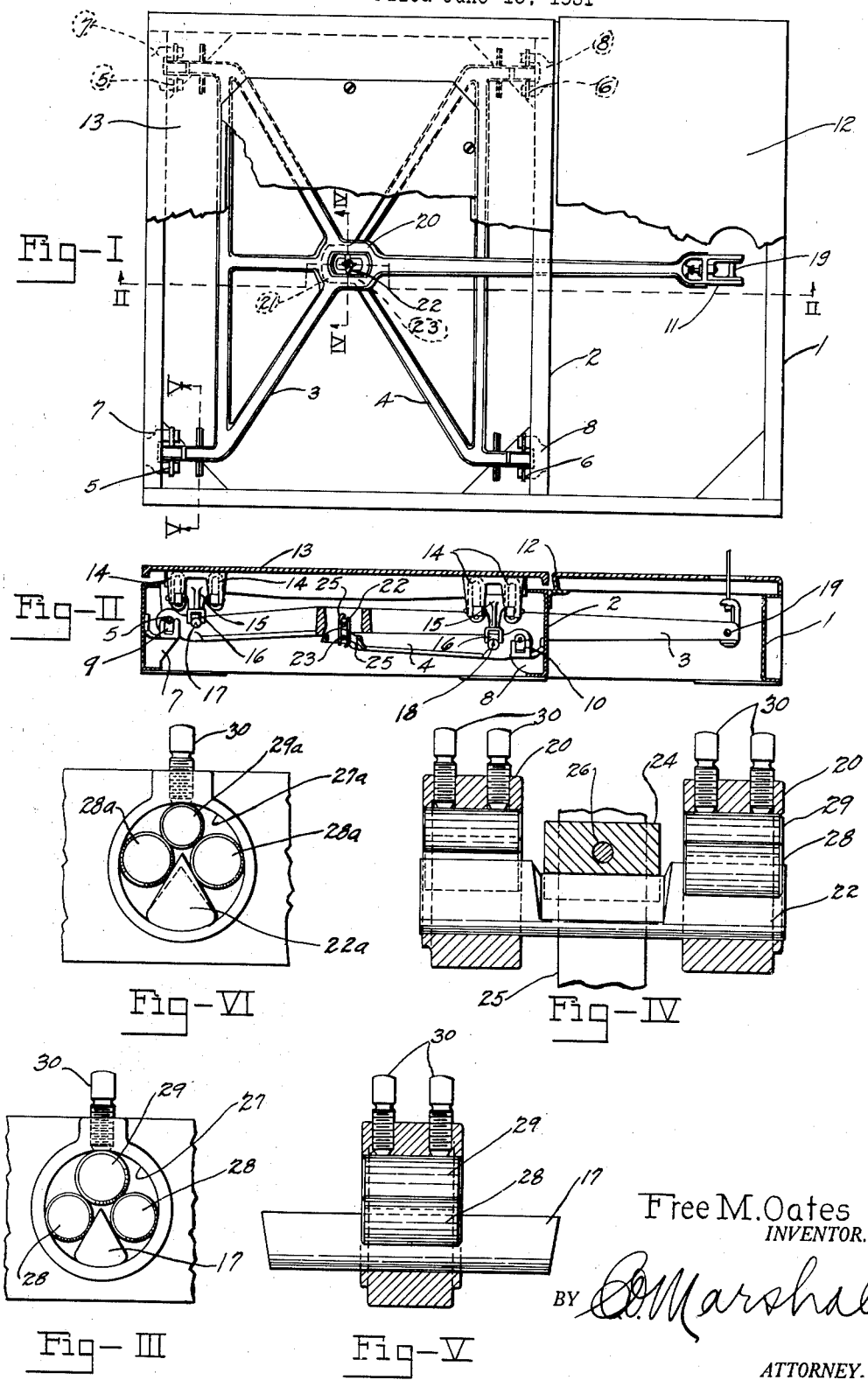
April 10, 1934.  F. M. OATES  1,954,181
WEIGHING SCALE PIVOT
Filed June 15, 1931
Free M. Oates
INVENTOR.
ATTORNEY.

1,954,181

UNITED STATES PATENT OFFICE 1,954,181

WEIGHING SCALE PIVOT

Free M. Oates, Toledo, Ohio, assignor to Toledo Scale Manufacturing Company, Toledo, Ohio, a corporation of New Jersey Application June 15, 1931, Serial No. 544,335

4 Claims. (Cl. 308—2)

This invention relates to weighing scales and particularly to means for retaining pivots in scale elements, in a manner so that spaced relationship of them is invariably maintained. It has been the general custom in constructing weighing scales to insert the pivots substantially in their position and then attain the accurate distances between their edges by honing or grinding. Pivots have also been fixed in apertures in levers by means of retainers which permitted the pivot edges to be adjusted. The latter practice has been found uneconomical on account of the time required to make such adjustments. It was also found that after a scale is installed, incompetent mechanics, whose duty it is to service such installations, are apt to destroy the original accuracy of the scale by carelessly adjusting such pivots. The method of honing the pivot edges to the correct distance is not applicable to pivots which are made of steel-aluminum alloys and hardened by the nitriding process, as the hardness decreases towards the interior of the pivot and any removal of the hard case of the pivot is detrimental to its action and "life." It is a recognized fact that the condition of the pivots determine the accuracy and sensitiveness of any scale. Rust and corrosion are also great factors in reducing such accuracy and by making the pivots of steel-aluminum alloys and hardening them by the nitriding process, much trouble is obviated as such pivots are extremely rust resistant.

The principal object of this invention resides, therefore, in the provision of improved means for retaining pivots in a scale element in a manner so that no adjustments by honing or grinding are necessary, in determining the spaced relationship of the pivots.

Another object is the provision of improved means for fixing a plurality of pivots in a lever or other scale element which permit them to be readily interchanged.

Another object is the provision of improved means for retaining pivots in scale elements by means of short sections of metallic cylindrical members.

These and other objects and advantages will be apparent from the following description wherein reference is had to the accompanying drawing and in which similar reference numerals designate similar parts throughout the several views.

In the drawing:—

Figure I is a plan view of a scale platform lever mechanism embodying my invention, portions of the platform and deck being broken away.

Figure II is a side elevational view thereof, the frame being sectioned substantially along the line II—II of Figure I and portions of the levers being broken away.

Figure III is an enlarged fragmentary view of a portion of a scale lever and a pivot fixed therein, in accordance with my invention.

Figure IV is an enlarged cross sectional view through the center connection pivot of the long lever substantially along the line IV—IV of Figure I.

Figure V is an enlarged cross section through the load supporting pivot of the long lever substantially along the line V—V of Figure I; and Figure VI is another enlarged fragmentary view of a portion of a scale lever showing the adaptability of my invention in retaining pivots of different size.

Referring to the drawing in detail, the platform mechanism shown consists of a box-like frame 1 usually made of architectural or structural iron and is divided into two compartments by a channel member 2. The larger compartment contains a load supporting lever system comprising a long main lever 3 and a shorter auxiliary lever 4. These levers are provided with fulcrum load and nose pivots which are in spaced relation to each other. Fulcrum pivots 5 and 6 stationed in the arms of the long and short levers respectively, rest upon fulcrum brackets 7 and 8 in which a plurality of bearings 9 and 10 are located. The nose iron 11 of the long lever 3 extends through an aperture in the dividing member 2, into the other compartment of the frame 1. This compartment is covered by a stationary deck or platform 12 upon which the counterbalancing mechanism of the scale is mounted. I have not shown a counterbalancing mechanism as per se it forms no part of the invention, which may be used in connection with any preferred scale mechanism. A platform 13 is suspended by suitable links 14 from a plurality of bearing brackets 15 which rest with their bearings 16 on the load pivots 17 and 18 in the levers 3 and 4 respectively. A pivot 19 is stationed in the nose lever 3 and serves to transmit the force of a load on the platform to the counterbalancing mechanism. The levers 3 and 4 have bifurcated portions 20 and 21 through which connection pivots 22 and 23 extend. These pivots face in opposite directions and are connected by a loop comprising bearings 24 and connecting plates 25. These plates and bearings are connected by pins 26 which extend through apertures in the plates 25 and the bearings 24.

In describing the embodiment of the invention, we may take pivot 17 for an example; the cross section of this pivot is in the form of a segment of a circle equal in diameter to the circular bore 27 (Figure III) so that the knife edge of the pivot is coincident with the axis of the bore. It will be readily seen that regardless of the position which the pivot occupies within the bore, the position of the knife edge will never change. For retaining this pivot, I employ three relatively small metal cylinders 28 and 29, their length being equal to the thickness of that portion of the lever through which the pivot extends. One of these cylinders 28 is placed on each side of the vertical axis of the pivot so that it rests against the inside wall of the bore 27 and against its sloping sides. A third cylinder 29 is placed in contact with the two cylinders 28, and having pressure exerted thereon by means of the screws 30, forces the two cylinders 28 into wedging engagement with the pivot 17 resulting in that it is firmly held in position. The pivot 22 is retained in a similar manner, the only difference being that the pivot is clamped at each end by a set by cylinders 28 and 29 instead of at the center. Figure VI shows a modification; when it is not desired or it is immaterial whether the edge of the pivot 22a is coincident with the axis of the bore 27a, by varying the diameter of the round cylinders 28a and 29a, pivots of any reasonable different size may be employed. This at times is very desirable in building spacial scales, when due to unforeseen service conditions, the lever is subjected to greater loads whereby its deflection is more than was calculated and it is necessary that the "range" of the pivots be increased.

While it will be apparent that the illustrated embodiments of my invention are herein disclosed and well calculated to adequately fulfill the objects, it is to be understood that the invention is susceptible to variation, modification and change within the spirit and scope of the subjoined claims.

Having described my invention, I claim:

1. In a device of the class described, in combination, a scale member having a circular bore therein, a wedge shaped pivot and a plurality of cylindrical members within said bore engaging the converging sides of said wedge shaped pivot and means urging said cylindrical members to exert clamping forces on said pivot.

2. In a device of the class described, in combination, a scale member having a circular bore therein, a wedge shaped pivot and a plurality of cylindrical members within said bore engaging the converging sides of said wedge shaped pivot, the axes of said cylindrical members being parallel to the axis of said pivot and means for exerting clamping forces on said pivot through said cylindrical members.

3. In a device of the class described, in combination, a scale member having a circular bore therein, a pivot having substantially the cross section of a sector of a circle equal in diameter to the circular bore, a cylindrical member disposed on either side of said pivot parallel therewith and engaging the converging sides thereof and means for clamping said pivot and said cylindrical members in said circular bore.

4. In a device of the class described, in combination, a scale member having a circular bore therein, a pivot having substantially a cross section of a sector of a circle equal in diameter to the circular bore, a cylindrical member disposed on either side of said pivot and parallel therewith and means for clamping said pivot and said cylindrical members in said circular bore, said clamping means comprising a further cylindrical member and a screw extending through an aperture in said scale member.

FREE M. OATES.